US008453610B2

United States Patent
Houle

(10) Patent No.: US 8,453,610 B2
(45) Date of Patent: Jun. 4, 2013

(54) VERSATILE CONTAINER

(76) Inventor: André Houle, St-Gérard-des-Laurentides (CA)

(*) Notice: Subject to any disclaimer, the term of this patent is extended or adjusted under 35 U.S.C. 154(b) by 0 days.

(21) Appl. No.: 11/819,846

(22) Filed: Jun. 29, 2007

(65) Prior Publication Data

US 2007/0251468 A1 Nov. 1, 2007

Related U.S. Application Data

(63) Continuation-in-part of application No. 10/888,115, filed on Jul. 9, 2004, now abandoned.

(60) Provisional application No. 60/486,258, filed on Jul. 11, 2003.

(51) Int. Cl.
*F22B 33/02* (2006.01)

(52) U.S. Cl.
USPC .......... 122/123; 122/37; 122/95.2; 122/209.1; 392/445; 392/450

(58) Field of Classification Search
USPC .................... 122/19.2, 37, 59, 95.1, 95.2, 96, 122/123, 209.1, 221, 223, 439; 126/361.1; 392/445, 447, 448, 450, 453; 220/501, 504, 220/507, 553, 554, 565, 581
See application file for complete search history.

(56) References Cited

U.S. PATENT DOCUMENTS

| 2,250,900 | A | * | 7/1941 | Alexander | 122/37 |
| 4,438,728 | A | * | 3/1984 | Fracaro | 122/18.31 |
| 4,632,066 | A | * | 12/1986 | Kideys | 122/18.2 |
| 4,692,592 | A | * | 9/1987 | Kale | 392/450 |
| 5,056,712 | A | * | 10/1991 | Enck | 236/20 R |
| 5,575,273 | A | * | 11/1996 | Moore, Jr. | 122/18.2 |
| 6,080,971 | A | * | 6/2000 | Seitz et al. | 219/483 |
| 6,427,638 | B1 | * | 8/2002 | Kolbusz et al. | 122/15.1 |
| 6,553,948 | B1 | * | 4/2003 | Luo | 122/18.1 |
| 6,957,014 | B2 | * | 10/2005 | Ho | 392/449 |
| 7,421,784 | B2 | * | 9/2008 | Akkala et al. | 29/890.03 |
| 2004/0079749 | A1 | * | 4/2004 | Young et al. | 219/486 |
| 2005/0194456 | A1 | * | 9/2005 | Tessier et al. | 236/51 |

* cited by examiner

*Primary Examiner* — Gregory A Wilson
(74) *Attorney, Agent, or Firm* — Equinox Protection; Franz Bonsang, Patent Agent

(57) ABSTRACT

A hot water tank comprising a sleeve, a removable top lid, at least one changeable water holding compartment adapted to be stacked vertically within the sleeve, stacked compartments being connected by a connecting pipe and at least one heating means provided with one of the compartments. The changeable compartments are configured to be removable from the sleeve upon removal of the top lid in case of failure and the space between the sleeve and the changeable compartments is adapted to hold the contents of the compartments during a leak.

15 Claims, 2 Drawing Sheets

VERSATILE CONTAINER

This application claims priority based on provisional application 60/486,258 filed Jul. 11, 2003 and is a continuation-in-part of U.S. patent application Ser. No. 10/888,115 filed on Jul. 9, 2004.

BACKGROUND OF THE INVENTION

1. Field of the Invention

This invention relates generally to a versatile container but more particularly to a versatile container having a removable top lid. The versatile container comprises a sleeve; at least one compartment housed within said sleeve, the compartment having walls for containing liquid or gas, and wherein said compartment are removable from the tank upon removal of said top lid. The sleeve can be sealed or not and has as its particularity that it can be extremely versatile and can have changeable compartments with heating means or not. The sleeve can be adapted to any existing or future compartments of any size or model, with or without heating means, and has the possibility of having one or many individual compartments being exchangeable upon rusting/piercing/breakage, instead of changing the complete container. The sleeve can also hold the entire contents of the at least one compartment, if it pierces. The sleeve can also possess a diversified array of sensors (example: water, fire, electricity, etc.) and a computer capable of cutting all energy sources, liquid, solids, gas or other, when, for example, the container leaks. There can also be a valve to empty the contents of the sleeve or the container when there is a leak. The computer will let you know of the problem via Internet, telephone, insurance company, police, medical, fire and will shut off the liquid or gas until help arrives. The container according to the present invention can also have a plurality of interconnecting compartments which progressively warm up the liquid or gas by way of interconnecting pipes. But this concept could be applied to many other things, such as any type of liquid or gas contained from leaking, like a double-walled pipeline or even a tank or container in or above ground, lakes or river and ocean. The reverse can also be said for the same concept, for example it can also stop the infiltration of gas, liquid or any contaminant from entering inside. Another example of this concept would be double hull boats or even submarines or tanker trucks that upon rupturing a first hull of the boat, submarine and so forth, the inner hull will not be breached and allow anything to enter.

2. Background

Hot water tanks have not evolved much in many years. Whether they are gas, oil or electric, they are basically large reservoirs containing water and means for warming water. In the case of electric water tanks, a lower and an upper element alternate to keep the water evenly warm. An emergency vent on top handles high pressure while a drain at the bottom is used when emptying the tank.

Over the years, a variety of accessories have been developed to complement the features of a hot water tank such as timers to start and stop water heating as an energy saving feature and humidity alarms to detect water leaks and shut off water intake to the tank.

However, there are many improvements to be brought to the hot water tanks which already exist in order to palliate certain inefficiencies with these existing water tanks and therefore, there is a need for an improved hot water tank.

SUMMARY OF THE INVENTION

It is a main object of this invention to provide an improved versatile container.

In order to do so, the present invention provides a versatile container comprising:
- a sleeve;
- at least one compartment housed within said sleeve, the compartment having walls for containing liquid or gas; and
- a top removable lid;

and wherein said compartment is removable from the container upon removal of said top lid.

But this concept could be applied to many other things. Such as any type of liquid or gas contained from leaking, like a double-wall pipeline or even a tank or container in or above ground, lakes, river and ocean. The reverse can also be said for the same concept, example: it can also stop the infiltration of gas, liquid or any contaminant from entering inside. Another example of this concept would be double hull boats or even submarines or tanker trucks that upon rupturing the first hull of the boat, submarine and so forth, the inner hull will not be breached and allow anything to enter.

In a preferred embodiment, the versatile container can be sealed or not and it has as its particularity that it can be extremely versatile and can have changeable compartments with heating means or not. It may be adapted to any existing or future compartments of any size or model, with or without heating means, and having the possibility of having one or many individual compartments being exchangeable upon rusting/piercing/breakage instead of changing the complete container.

The sleeve can also hold the entire contents of the compartments, if any of the latter pierces. The sleeve can also possess a diversified array of sensors (example: water, fire, electricity, etc.) and a computer capable of cutting all energy sources, liquid, solids, or gas or other, when a problem arises, i.e., when, for example, a compartment leaks. There could also be a valve to empty the contents when there is a leak. The computer will let you know of the problem via Internet, telephone, insurance company, police, medical, fire, and will shut off the liquid or gas until help arrives. And it can be realized with a plurality of interconnecting compartments which progressively warm up the liquid or gas by way of interconnecting pipes. As the heat loss from the lower compartments rises, the compartment on the top level recuperates the heat loss from the air from the middle and lower level compartments, so as to provide a more economical and ecological container.

Preferably, the container includes a plurality of vertically stacked compartments which are lodged within a sleeve lining the container and providing increased insulation as well as a safety in case of leaks. The container, which can be sealed or not, and if sealed, it can be made airtight or you can replace the air with a gas to increase its insulation properties. The vertically stacked compartments are linked together by interconnecting pipes. Furthermore, as the heat loss from the lower compartments rises, the compartment on the top level recuperates the hat loss from the middle and lower level compartments, so as to provide a more economical and ecological container by heating the liquid or gas in the uppermost compartment by convection. The container has a top removable lid which allows for the removal of the compartments so as to minimize the amount of disposable material (example: heating elements, heating means, compartments, etc.) and to facilitate the maintenance of the compartments and/or the sleeve, thus producing a more ecologically friendly container. Of course, such an advantage as a container with a top removable lid could be found on a single compartment container but would lose some of the advantages of a multi-compartment container. Optionally, features such as a humidity detector can warn of a leak and send a signal to electromechanically shut off the liquid or gas to the container. A timer or computer can also be programmed for partially or totally shut off heating at selected times. This system can also be used to shut off all kind of energy to the unit, liquids, solids or gas or other, when a problem arises; example, a compartment leaks. The computer will let you know of the problem via the internet, and you can program by internet to correct the problem, or by telephone, insurance company, police, medical, fire, and will shut off the water until help arrives.

One advantage of a multi-compartment container is that only one compartment needs to be heated to provide hot liquid or gas on demand during off peak hours, such as night time when water from other compartment could be left unheated in order to provide further energy savings while at the same time providing a quicker warm-up time since each compartment has its own heating means. Heating means generally refer to means of generating or transferring heat to water such as, but not limited to, electricity, gas, oil, wood, coal, combustible solids, solar, geothermal, nuclear and so forth. All the heating means can be activated at the same time there is constant demand for hot liquid or gas. However, it is not necessary to have heating means on all the compartments, as the top compartment recuperates the heat from the lower compartments via the air or the fitted pipes.

The foregoing and other objects, features, and advantages of this invention will become more readily apparent from the following detailed description of a preferred embodiment of the invention with reference to the accompanying drawings, wherein the preferred embodiment of the invention is shown and described, by way of examples such as illustrating 3 compartments whereas as little as two and as many as an infinite number of compartments are defined as "multicompartments". As will be realized, the invention is capable of other and different embodiments, and its several details are capable of modifications in various obvious respects, all without departing from the spirit invention. Accordingly, the drawings and description are to be regarded as illustrative in nature, and not as restrictive.

DETAILED DESCRIPTION OF THE PREFERRED EMBODIMENTS

Figure 1:
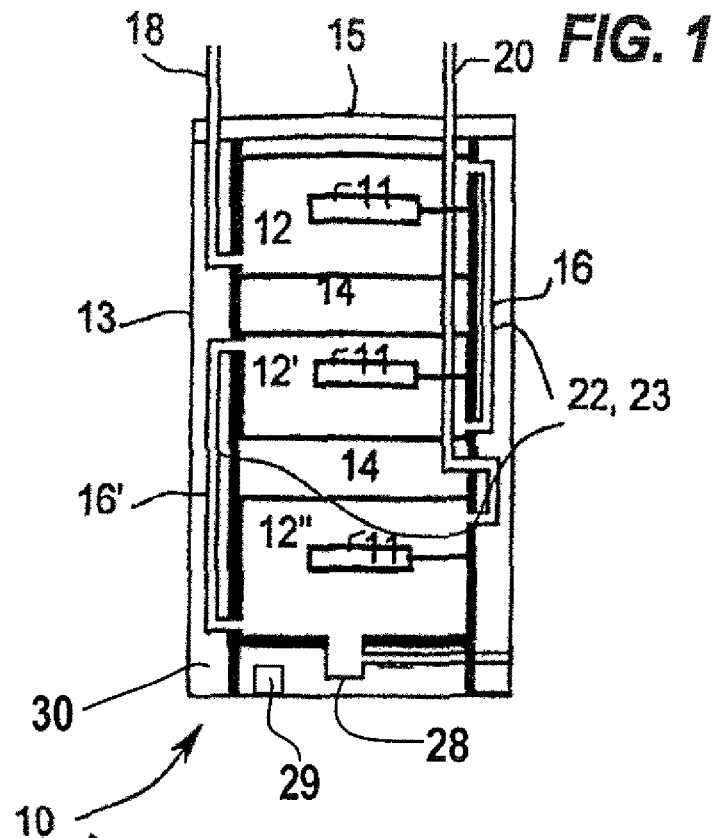
FIG. 1 Side cutaway elevation of a hot water tank according to a preferred embodiment of the present invention.

Referring to FIG. 1, there is provided a versatile container in the form of a hot water tank (10). The hot water tank (10) includes a sleeve (13) in which are vertically stacked a plurality of compartments (12, 12', 12") spaced from each other by an air-tight space (14). The sleeve (13) is preferably hermetically sealed or air-tight. The sleeve (13) can adapt to any existing or future water container of any size or model, with or without heating means, and having the possibility of having individual or many water compartments being re-changeable upon rusting/piercing/breaking instead of completely changing the tank. The sleeve (13) can also contain or hold the entire contents of the hot water tank if the compartments (12, 12', 12") are pierced. Preferably also, there is a valve (28) to empty the contents when there is a hot water leak in the sleeve. Furthermore, the sleeve (13) may comprise a diversified array of sensors (29) (for example: water, fire, electricity, etc.) and a computer (29) capable of cutting all energy sources, liquid, solids or gas or other, when a problem arises: for example, when a water container leaks. The computer will let a user know of the problem via internet, and the user can program by internet to correct the problem, or by telephone, insurance company, police, medical, fire and will shut off the water until help arrives. The compartments (12, 12', 12") are separated from each other. Optionally, features such as a humidity detector can warn of a leak and send a signal to electromechanically shut off the water supply to the tank. A timer, or the computer, can also be programmed for partially or totally shut off water heating at selected times. The whole sleeve (13) could be sealed or not, and if sealed, it can be made air-tight and the air inside (30) can be changed to a gas to increase insulation. The air-tight space acts to increase the insulation properties of the compartments (12, 12', 12").

Each compartment (12, 12', 12") may further be provided with one or more heating means (11). The compartments (12, 12', 12") are interconnected by a connecting pipe (16, 16') of a diameter equivalent to a water inlet pipe (18') or a water outlet pipe (20) so that water can circulate between compartments (12, 12', 12") as fast as it can be taken in by the water inlet pipe (18) or taken out by the water outlet pipe (20). It is interesting to note that the connecting pipes (16, 16') may be contained within the compartments (12, 12', 12"), or, alternatively, may extend between the sleeve (13) and the compartments (12, 12', 12").

The tank (10) is also provided with a top removable lid (15). The lid (15) can be fastened onto the sleeve (13) by way of any type of mechanical fasteners adequate for securely attaching the lid (15) in a non permanent manner so as to make it removable. The lid also allows for removal of the compartments (12, 12', 12") and the interconnected pipes (16, 16') with heating means or not so as to minimize the amount of disposal material, (example: heating elements, heating means, water containers, etc.) thus producing a more ecologically friendly hot water tank.

Cold water travels downward from the uppermost compartment (12) where it becomes warm, by way of the connecting pipe (16) to the middle compartment (12') where it becomes warmer. The water then travels to the lowermost compartment (12"), by way of the connecting pipe (16') where it is heated to a typical hot water tank temperature. From the lowermost compartment (12") it exits by the outlet pipe (20) for use.

Figure 3:
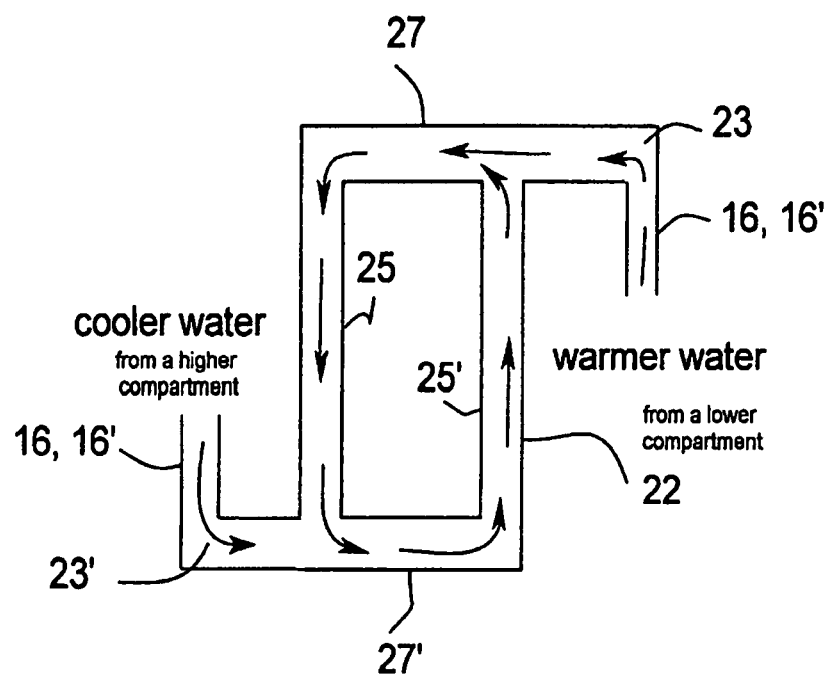
FIG. 3 Side elevation of a heat trap according to the present invention.

As shown in FIG. 3, to reduce water's tendency to migrate between compartments (12, 12', 12"), a heat trap (22) is set on connecting pipes (16, 16'). A heat trap (22) is designed to create an eddy which slows down water circulation, thus slowing down water migration. It consists of two ends (23, 23') interfacing with a pipe; in this case, the pipe is the connecting pipe (16, 16') which is sectioned off to allow insertion of the heat trap (22). The heat trap (22) is generally formed by two substantially parallel pipe segments (25, 25') and joining segments (27, 27').

When a user uses hot water, the water will be taken from the lowermost compartment (12") which will require water from the middle compartment (12') to replenish it. Therefore, water in the connecting pipes (16, 16') will travel from a higher compartment, either the uppermost compartment (12) or the middle compartment (12'), towards a lower compartment, either the middle compartment (12') or the lowermost compartment (12") respectively. However, when no one uses the water, warmer water will tend to migrate, by way of the connecting pipes (16, 16'), from the lower compartments, where it is warmer, to higher compartments, where it is cooler. In order to slow down the migration, a heat trap (22) is placed within the path of the connecting pipe (16, 16'). Because of the two paths water can take in the pipe segments (25, 25'), along with the direction as indicated by the arrows, an eddy is created by conflicting tendencies of water having different temperatures. For example, warm water does not want to travel downwards as it is forced to do in the pipe segment (25) but it wants to go up as it does in the pipe segment (25'), which creates an eddy which in turn tends to draw cooler water rather than letting warmer water migrate towards cooler water. There is still transfer of heat but it is slowed down.

As such, one advantage of a multi-compartment tank is that only one compartment needs to be heated to provide hot water on demand during off peak hours, such as night time when water from other compartments could be left unheated in order to provide further energy savings while at the same time providing a quicker warm up time since each compartment has its own heating means. Heating means generally refer to means of generating or transferring heat to water such as, but not limited to, electricity, gas, oil, wood, coal, combustible solids, solar, geothermal, nuclear and so forth. All the heating means can be activated at the same time when there is constant demand for hot water. However, it is not necessary to have heating means on all the water containers, as the top container recuperates the heat from the lower compartments via the air-tight space surrounding the compartments or the fitted pipes.

The heat trap (22) can be used on standard hot water tanks as well as any type of plumbing where heat transfer needs to be slowed down and can therefore have applications well beyond the application discussed in this instant invention.

Figure 2:
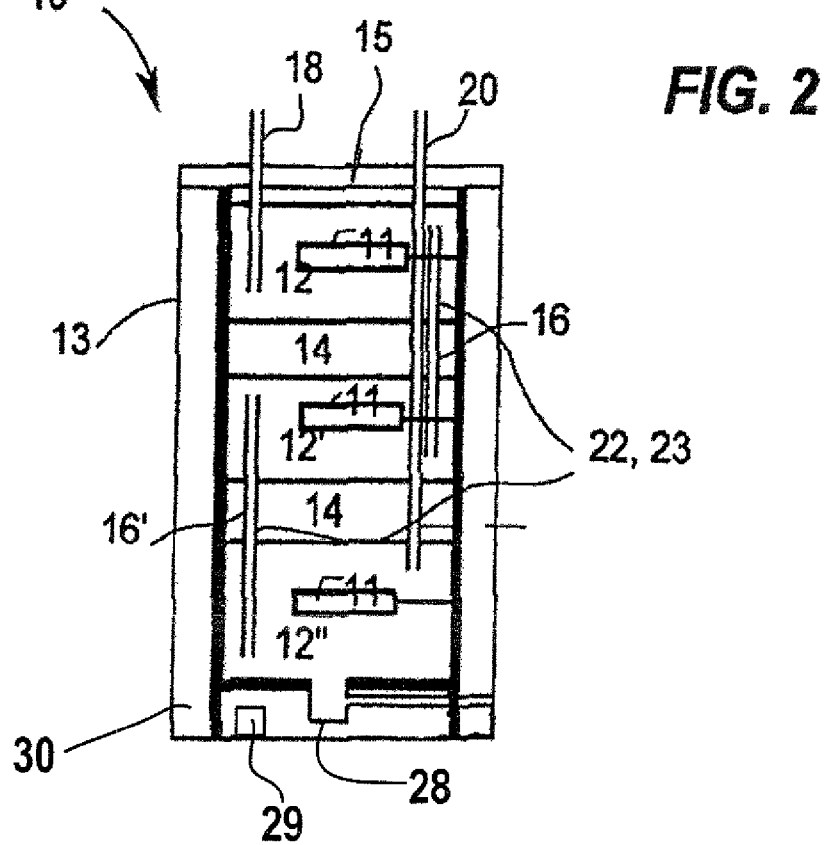
FIG. 2 Side cutaway elevation of a first example embodiment of the hot water tank.

Another preferred embodiment of the invention is shown in FIG. 2. The hot water tank (10) can include the heat traps (22) but where the connecting pipes (16, 16') run inside the compartments (12, 12', 12") instead of outside as per the embodiment shown in FIG. 1.

But this concept could be applied to many other things such as any type of liquid or gas contained from leaking, like a double-walled pipeline or even a tank or container in or above ground, lakes, river and ocean. The reverse can also be said for the same concept, for example it can also stop the infiltration of gas, liquid or any contaminant. Another example of this concept would be double-hulled boats or even submarines or tanker trucks that upon rupturing the first hull of said boat, submarine and so forth, the inner hull will not be breached and allow anything to enter.

Although a preferred embodiment of the present invention has been described in detail herein and illustrated in the accompanying drawings, it is to be understood that the invention is not limited to this embodiment and that various changes and modifications could be made without departing from the scope of the present invention.

The invention claimed is:

1. A hot water tank comprising:
    a sleeve;
    a removable top lid;
    at least one changeable water holding compartment adapted to be stacked vertically within said sleeve, stacked compartments being connected by a connecting pipe; and
    at least one heating means provided with one of the compartments;
wherein said changeable compartments are configured to be removable from said sleeve upon removal of said top lid in case of failure and wherein space between said sleeve and said changeable compartments is adapted to hold the contents of said compartments during a leak.

2. The hot water tank of claim 1, wherein the compartments are spaced apart from each other.

3. The hot water tank of claim 2, wherein the compartments are spaced from each other by an air-tight space.

4. The hot water tank of claim 1, wherein the heating means is selected from a group consisting of electrical, gas, oil, wood, coal, combustible solids, solar, geothermal and nuclear.

5. The hot water tank of claim 1, wherein said heating means can be activated independently.

6. The hot water tank of claim 1, wherein the hot water tank comprises at least two compartments provided with heating means, and wherein said heating means can be activated independently or simultaneously.

7. The hot water tank of claim 1, wherein said heating means are electrical heating elements, said electrical heating elements heat to a controlled level of temperature water that is traveling downward from an upper compartment to a next lower compartment by way of the corresponding connecting pipe, whereby, in use, water in upper compartments is further heated through convection by lower compartments containing water that is heated by the electrical heating elements so that water entering the tank is warmed progressively and controllably before exiting the tank.

8. The hot water tank of claim 1, further comprising heat traps, said heat traps having two ends interfacing with a pipe connecting a lower compartment and an upper compartment, wherein the heat trap slows down circulation of water.

9. The hot water tank of claim 1, wherein said hot water tank being sealable so as to be made air-tight or so that the air can be changed for a gas, with a positive or negative pressure, to diminish heat losses.

10. The hot water tank of claim 1, further comprising a diversified array of sensors and a computer for cutting all energy sources, liquid, solids or gas or other, when a problem arises.

11. The hot water tank of claim 10, wherein a user can remotely program said computer to correct the problem.

12. The hot water tank of claim 11, wherein the user can remotely program said computer via internet or telephone.

13. The hot water tank of claim 10, wherein said computer is programmed to partially or totally shut off said heating means at selected times.

14. The hot water tank of claim 1, further comprising a valve to empty the contents of said sleeve when there is a leak.

15. The hot water tank of claim 1, further comprising a leak detector adapted to electromechanically shut off water supply to the tank.

* * * * *